United States Patent
Yoon et al.

(10) Patent No.: US 6,264,709 B1
(45) Date of Patent: Jul. 24, 2001

(54) METHOD FOR MAKING ELECTRICAL AND ELECTRONIC DEVICES WITH VERTICALLY INTEGRATED AND INTERCONNECTED THIN-FILM TYPE BATTERY

(75) Inventors: Young Soo Yoon, Kyungki-do; Hyung Jin Jung; Won Kook Choi, both of Seoul; Seok Jin Yoon, Kyungki-do, all of (KR)

(73) Assignee: Korea Institute of Science and Tech. (KR)

( * ) Notice: Subject to any disclaimer, the term of this patent is extended or adjusted under 35 U.S.C. 154(b) by 0 days.

(21) Appl. No.: 09/296,198

(22) Filed: Apr. 21, 1999

(30) Foreign Application Priority Data

Aug. 21, 1998 (KR) .................................................. 98-33967

(51) Int. Cl.⁷ ...................................................... H01M 6/18
(52) U.S. Cl. ......................................... 29/623.5; 29/623.1
(58) Field of Search ................................. 29/623.1, 623.5

(56) References Cited

U.S. PATENT DOCUMENTS

| | | | |
|---|---|---|---|
| 5,338,625 | 8/1994 | Bates et al. | 429/193 |
| 5,567,210 | * 10/1996 | Bates et al. | |
| 5,705,293 | 1/1998 | Hobson | 429/162 |
| 6,168,884 | * 1/2001 | Neudecker et al. | |

* cited by examiner

*Primary Examiner*—John S. Maples
(74) *Attorney, Agent, or Firm*—Ostrolenk, Faber, Gerb & Soffen, LLP

(57) ABSTRACT

An electrical or electronic device and a thin-film type battery are vertically integrated and interconnected for reducing the area occupied thereby, enabling a higher degree of device integration and simplifying their fabrication. An insulating layer is formed on the device, with vertical conductors extending respectively from a pair of terminals of the device through the insulating layer. Electrode conductors are formed on the insulating layer in contact with the respective vertical conductors and serve as the cathode and anode electrodes of a thin-film battery fabricated thereon.

7 Claims, 4 Drawing Sheets

METHOD FOR MAKING ELECTRICAL AND ELECTRONIC DEVICES WITH VERTICALLY INTEGRATED AND INTERCONNECTED THIN-FILM TYPE BATTERY

BACKGROUND OF THE INVENTION

1. Field of the Invention

The present invention is directed to the manufacture of electrical and electronic devices having an integral thin-film type battery electric power source, by using semiconductor fabrication techniques, and more particularly, to the manufacture of electrical and electronic devices having self-contained vertically integrated and interconnected thin-film type batteries whereby the device area is minimized, enabling a higher degree of integration, and to the devices manufactured thereby.

2. Description of the Background Art

As the manufacture of electrical and electronic devices by employing semiconductor fabrication techniques has increasingly being more commonplace, the size of such devices has become miniaturized, and their power consumption requirements have accordingly also been reduced. In use, such devices are typically mounted on a substrate or carrier, and supplied with necessary electric power from an externally connected power source or supply.

Recently, thin-film type batteries usable as an electric power source for electrical and electronic devices have been developed. Such thin-film type batteries are attractive because they are stable in operation, are capable of high energy output and make it possible to minimize the size of a battery power source. Furthermore, because they can be manufactured using familiar thin-film fabrication techniques, such batteries can be usefully employed as power sources for miniaturized electrical and electronic devices.

An example of such a thin-film type battery is disclosed in U.S. Pat. No. 5,338,625, wherein it is suggested that a thin-film battery cell could be fabricated directly onto a semiconductor chip, the chip package or the chip carrier. A possible application thereof as proposed in U.S. Pat. No. 5,338,625 and as represented in FIG. 1 herein, is a thin-film rechargeable battery as a primary or standby power source for low current devices, which includes a Li-VO$_x$ thin-film battery cell 3 deposited onto a semiconductor chip package, with current leads 8 extending from the cell 3 to a semiconductor chip 2 mounted on the chip package. The thin-film battery cell as proposed therein would occupy an area of one square centimeter on the chip package, although it is further proposed therein that the capacity and current density of the battery could be increased by depositing a larger battery over the unused area of the chip package.

The use of thin-film batteries as power sources for miniature electrical and electronic devices is appealing, in that such batteries can be fabricated using similar techniques and processing as are employed for fabricating such devices. Also, such batteries can be freely fabricated in various shapes and sizes as desired. However, from the viewpoint of achieving higher integration of electrical and electronic devices, it is desirable to reduce the area occupied by such devices, and in case of integrating a thin-film battery as an "onboard" power source for such devices, it is thus desirable that the area occupied by the battery itself should be minimal. But the thin-film battery power source proposed in U.S. Pat. No. 5,338,625, being fabricated in horizontal or planar alignment with the semiconductor chip, that is, being laterally removed on the chip package from the chip, consequently occupies a significant area in addition to the area occupied by the chip itself, and such a horizontal arrangement of the battery and device does not admit of higher integration. Also, the lateral disposition of the thin-film battery relative the chip also necessitates current leads extending therebetween to be fabricated or otherwise provided on the chip package for enabling electrical interconnections therebetween, further increasing the area occupied by such an arrangement and complicating the fabrication process.

Moreover, although it is suggested in U.S. Pat. No. 5,338,625 that a thin-film battery could be fabricated directly onto a semiconductor chip, there is no disclosure therein as to how this could be accomplished, nor how the necessity could be avoided for externally providing current leads between the battery and the chip.

Thus, there has remained a need for integrating electrical and electronic devices with thin-film battery power sources in a way that minimizes the overall area occupied by such a combination and which lends itself to a higher degree of device integration in line with the trend of increasing miniaturization of micro-devices, and which uses current semiconductor and thin-film fabrication techniques.

SUMMARY OF THE INVENTION

Accordingly, it is an object of the present invention to achieve the higher integration of electrical and electronic micro-devices with thin-film battery power sources, by reducing the necessary area occupied thereby.

It is another object of the present invention to provide for the manufacture of electrical and electronic micro-devices with integrated thin-film battery power sources in a way that minimizes the area necessarily occupied thereby.

It is also an object of the present invention to provide an electrical or electronic device which is vertically interconnected with a thin-film battery power source.

It is further an object of the present invention to provide for the manufacture of electrical and electronic devices vertically integrated and electrically interconnected with thin-film type battery power sources.

In order to achieve the above objects, there is provided in accordance with the present invention an electrical or electronic device which is vertically both integrated and electrically interconnected with a thin-film type battery power source. By providing a thin-film type battery either underlying or overlying an electrical or electronic device, that is, in vertically superposed relation, the areal extent of the device and battery in combination can be advantageously minimized for enabling higher integration. And by providing vertical interconnections between the thin-film battery and the device, the areal extent can be further minimized while simplifying the fabrication. Both the device and the thin-film type battery, as well as the electrical interconnections therebetween may be fabricated using known techniques and processes employing currently available equipment.

In accordance with the present invention there is provided an electrical or electronic device having a thin-film battery directly laminated thereon, with an electrically non-conductive insulating layer interposed between a top or bottom surface of the device and the thin-film battery. Power terminals of the device are exposed via overlying or underlying openings formed through the insulating layer, and an electrically conductive material fills these openings and extends onto an outer surface of the insulating layer to form electrode conductors of the thin-film battery so as to electrically interconnect the device with the the thin-film battery.

In accordance with the present invention there is also provided a method for manufacturing an electrical or electronic device having a thin-film battery directly laminated thereon, which method includes forming an electrically non-conductive insulating layer on an upper or lower surface of an electrical or electronic device, exposing power terminals of the device by forming respective overlying or underlying openings in the insulating layer, depositing electrically conductive material in the openings and on an outer surface of the insulating layer to form respective electrode conductors, and forming a thin-film battery on the outer surface of the insulating layer with an anode and a cathode of the thin-film battery being respectively in electrical contact with the electrode conductors formed on the insulating layer.

BRIEF DESCRIPTION OF THE DRAWINGS

The present invention will become better understood with reference to the following detailed description taken together with the accompanying drawings which are given only by way of illustration and thus are not limiting of the present invention, wherein.

DETAILED DESCRIPTION OF THE INVENTION

The realization of an electrical or electronic device with a vertically integrated and interconnected thin-film type battery in accordance with the present invention will now be described with reference to the accompanying drawings. As it will be readily apparent to those skilled in the art that the present invention is equally applicable to both electrical and electronic devices as may be desired to be provided with integral electric power sources, and as a wide range of such electrical and electronic devices and their respective semiconductor fabrications are conventionally well-known, for convenience' sake, in the following description the term "device" will be used to refer to both electrical and electronic devices fabricated by semiconductor processing techniques.

Figure 1:
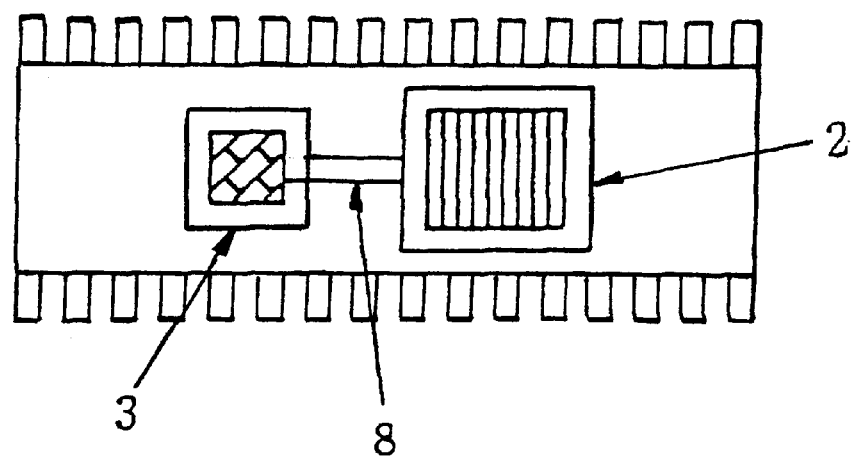
FIG. 1 illustrates a plan view of a thin-film type battery and an electronic device conventionally provided on a semiconductor chip package.
Figure 2:
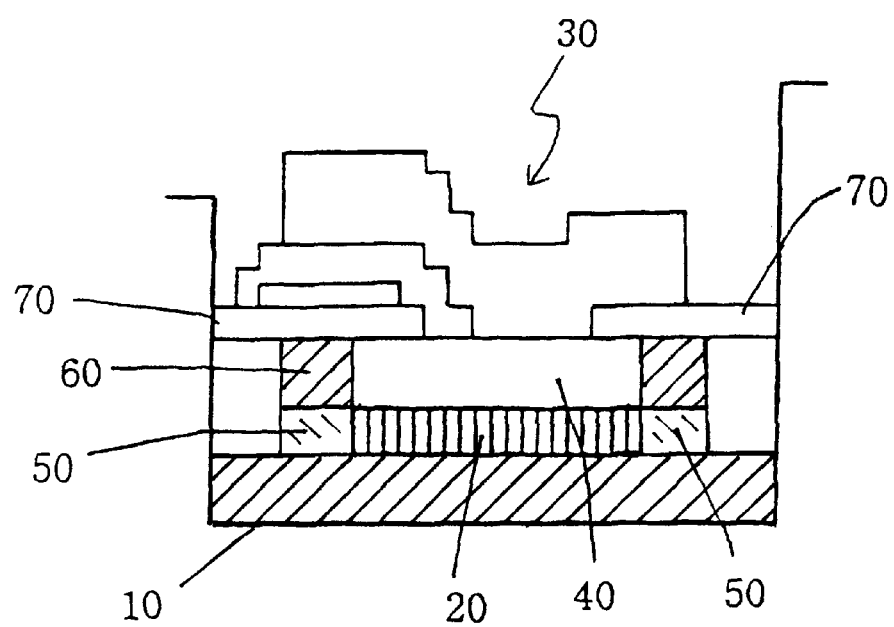
FIG. 2 illustrates is cross a thin-film type battery directly fabricated atop an electrical or electronic device in accordance with the present invention.

FIG. 2 illustrates in cross-section a device having a thin-film type battery fabricated vertically thereon and electrically interconnected therewith in accordance with the present invention. More specifically, on a substrate 10, for example, of silicon, there is fabricated a device 20, by known semiconductor fabrication techniques. On the device 20, or possibly on the substrate 10 but electrically connected with the device 20, there are provided a pair or more of respective terminals 50 by which the device is electrically connected with the anode and cathode of a thin-film type battery 30 which is fabricated atop the device 20 and vertically aligned therewith. Interposed between the device 20 and the thin-film battery 30 there is formed an electrically non-conductive insulating layer 40. The insulating layer 40 has openings or contact holes formed vertically therethrough respectively overlying the terminals 50, and these openings are respectively filled with an electrically conductive material forming vertical conductors 60 in contact with the terminals 50 and extending to the upper surface of the insulating layer 40. The conductive material filling the contact holes and forming vertical conductors 60 is further extended on the upper surface of the insulating layer 40 laterally outwardly of the contact holes and the vertical conductors 60 to form a pair of electrode conductors 70 on the upper surface of the insulating layer 40, which electrode conductors 70 serve as respective current collectors of the thin-film battery 30.

The thin-film type battery 30 is fabricated directly on the upper surface of insulating layer 40 and the electrode conductors 70. Battery 30 may for example be one fabricated as taught in U.S. Pat. No. 5,338,625, the disclosure of which is hereby incorporated herein by reference thereto. Details of the integrated fabrication of the device and battery will be further explained below with reference to the fabrication method according to the present invention.

Notably, because the thin-film type battery is fabricated directly atop the device and vertical conductors are formed between the device and the battery, the vertically integrated and interconnected device and thin-film type battery according to the present invention occupies only a small area lying generally within the areal extent of the device, e.g. the chip, itself, with the fabrication of the thin-film battery and the provision of electrical interconnections not occupying any additional area, and is thus more suitable for the high integration of micro-devices than the known horizontally disposed arrangement.

It will be readily apparent to those skilled in the art that instead of fabricating the thin-film type battery 30 on top of the device 20 as shown in FIG. 2, the thin-film type battery may be fabricated below the device if desired, or a pair of thin-film batteries may even be fabricated respectively above and below the device, as long as suitable provision is made for electrically insulating the device from the battery and extending conductive material from terminals of the device to electrode conductors of the battery formed thereon, and such modifications are contemplated within the scope of the present invention.

Figure 3A:
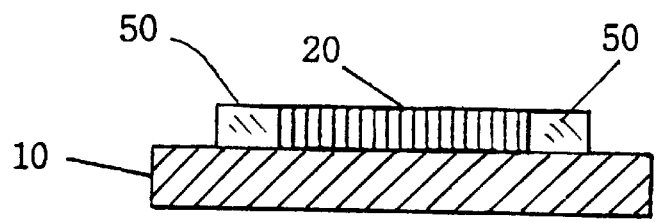
FIGS. 3A through 3F respectively illustrate stages in the fabrication of an electrical or electronic device and vertically integrated and interconnected thin-film type battery, and FIGS. 3G and 3H respectively illustrate a vertical cross-sectional and a plan view of the completed fabrication, in accordance with the present invention.

FIGS. 3A through 3F illustrate respective stages in the fabrication of a device with a vertically integrated and interconnected thin-film type battery in accordance with the present invention. As shown in FIG. 3A, the device 20 is first fabricated on the substrate 10 which may for example be of silicon. Fabrication of the device 20 can be accomplished by employing well-known techniques and processes which are selected and implemented in accordance with the type of device desired to be fabricated, and therefore will not be further described in detail as it is considered well within the capability of the artisan.

Figure 3B:
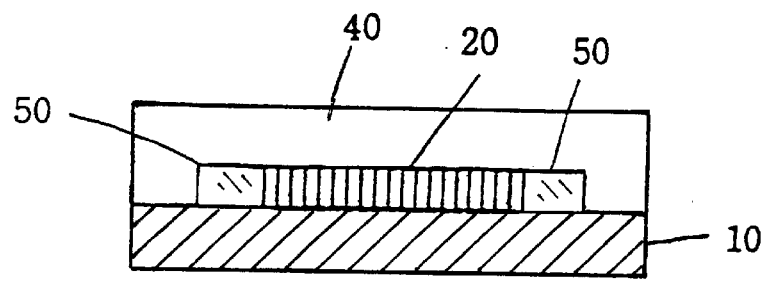

As shown in FIG. 3B, the insulating layer 40 is then formed on at least an upper portion of the device 20. The insulating layer 40 is formed of an electrically non-conductive material and a wide variety of such materials and their formation as thin films or layers, for example by deposition, are known in the art. If desired or necessary, the insulating layer 40 may be formed as a planarizing layer, or as an encapsulation layer 40' completely capping the device 20 and possibly also a surrounding portion of the substrate 10.

Figure 3C:
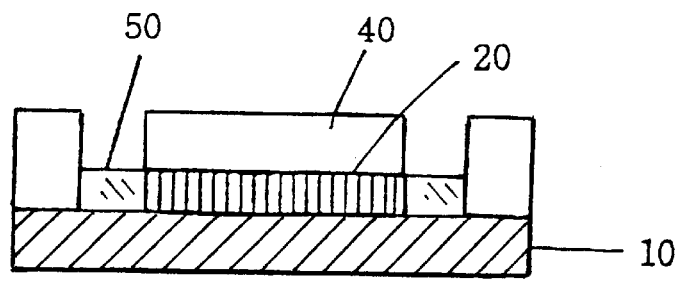

As shown in FIG. 3C, after forming the insulating layer 40 or encapsulation layer 40', vertical contact holes are formed through the layer 40 (40') at locations therein overlying the terminals 50 of the device 20 (or possibly on the substrate 10) so as to expose the terminals 50 through the layer 40 (40'). The formation of the contact holes 60 can be accomplished by known techniques, for example, by depositing a photo-resist film on the layer 40 (40'), patterning the photo-resist film and then selectively etching the layer 40(40') using the thusly patterned photo-resist film as an etching mask, to expose the terminals 50 through the layer 40(40').

Figure 3D:
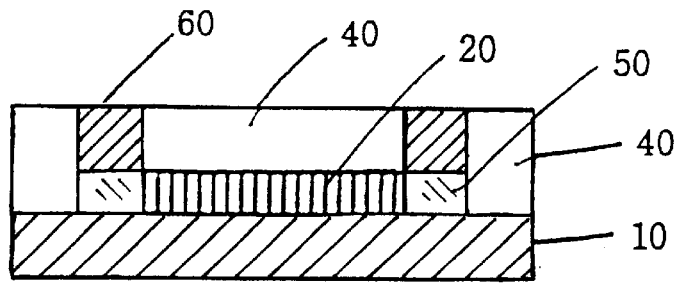

As shown in FIG. 3D, an electrically conductive material is then filled into the contact holes in the layer 40 (40') to form vertical conductors 60 which are in respective electrical contact with the corresponding terminals 50 of the device 20. Techniques for vertically filling contact holes with conductive material are well known in the art. For example, a conductive film may be deposited over the previously described photo-resist mask formed on the layer 40 (40') for completely filling the contact holes in the layer 40 (40'), and then the deposited conductive film and the photo-resist may be etched back until the photo-resist mask is completely removed and the upper surface of the insulating layer 40 (40') is exposed while leaving the vertical conductors 60 filled in the contact holes.

Figure 3E:
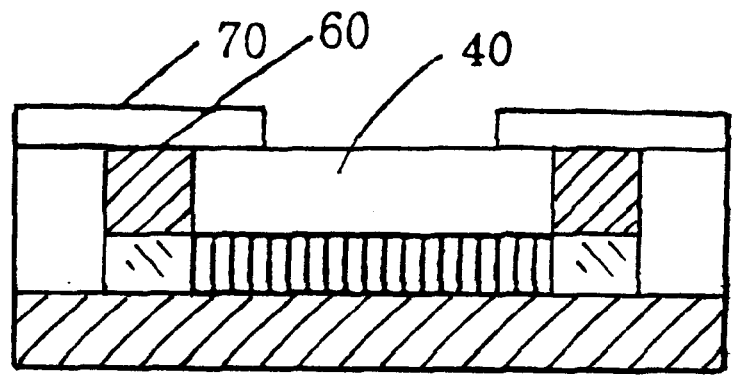

As shown in FIG. 3E, the pair of electrode conductors 70 for the thin-film battery are then formed on the upper surface of the insulating layer 40 (40') by known techniques, for example by depositing a conductive film of vanadium having and a thickness of 0.5 microns on the layer 40 (40'), forming a photo-resist film on the conductive film, patterning the photo-resist film and then etching the conductive layer using the patterned photo-resist film as an etching mask. One of the electrode conductors 70 will necessarily be formed wider, that is, with a greater areal extent, than the other, to provide major and minor current collectors, that is, cathode and anode electrodes respectively for the thin-film type battery.

It is possible to simplify the fabrication of the vertical conductors 60 and electrode conductors 70, for example, by depositing a single conductive film on the insulating layer 40 (40') for filling the contact holes to form the vertical conductors 60 as well as to form a conductive layer on the upper surface of the layer 40 (40') and then masking and etching this conductive layer to form the electrode conductors 70. It is also possible to dispense with the formation of the electrode conductors 70 altogether, and to instead simply utilize the vertical conductors 60 filling the contact holes in the insulation layer 40 (40') as cathode and anode conductors of the thin-film battery.

Figure 3F:
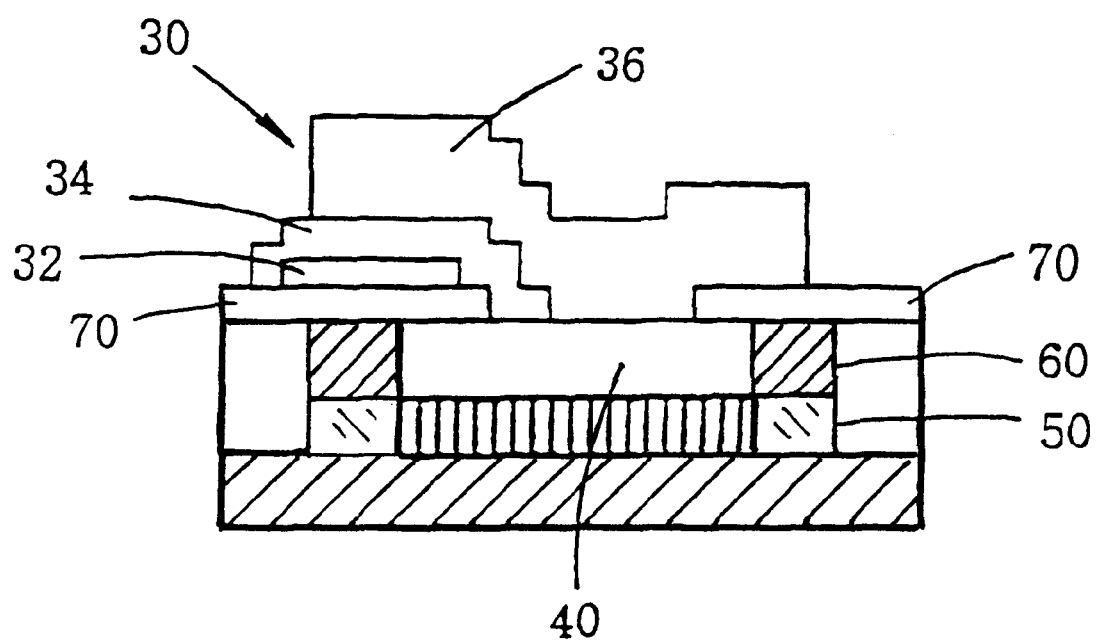

FIG. 3F illustrates the fabrication of the thin-film battery cell 30 on the insulating layer 40 (40') and electrode conductors 70. As noted previously, the thin-film battery may be one fabricated as taught by U.S. Pat. No. 5,338,625. In detail, a cathode film 32 is deposited on the wider one of the two electrode conductors 70. An electrolyte film 34 is then deposited over the cathode film 32. Then, an anode film 36 is deposited over the electrolyte film 34, the intervening portion of the insulating layer 40 (40') and the smaller one of the electrode conductors 70, to complete the cell fabrication.

The cathode film 32 may be for example an amorphous vanadium-oxide, $VO_x$, thin film formed by sputtering to a thickness of 1 micron. The electrolyte film 34 may be for example a vitreous amorphous oxynitride lithium also formed by sputtering to a thickness of 1 micron, and having the composition $Li_xPO_yN_z$ where x has the approximate value of 2.8; 2y+3z has the approximate value of 7.8; and z has the approximate value of 0.16 to 0.46. The anode film 36 may be for example of lithium with a thickness of about 5 microns.

Figure 3G:
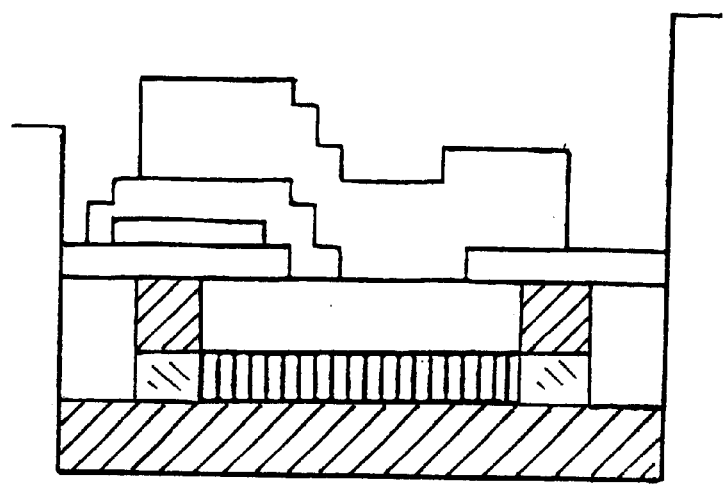
Figure 3H:
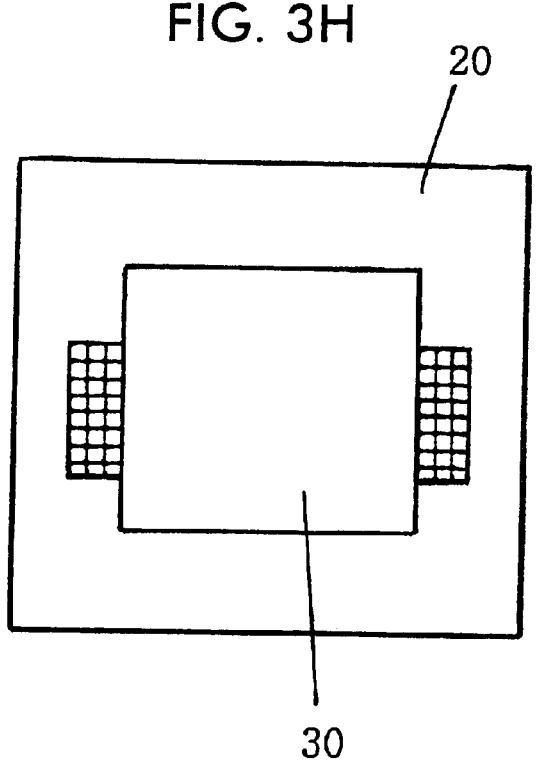

FIGS. 3G and 3H respectively illustrate a vertical cross-sectional view and a plan view of the completed vertically integrated and interconnected device and thin-film battery fabricated as described above, from which it can be seen that the battery is of almost identical size as the device, and that the device and battery are accommodated easily within the confines of a device isolation region. However, it will be appreciated that if desired the battery may be fabricated larger or smaller in size than the device.

As described above, electrical and electronic devices can be provided with vertically integrated and interconnected thin-film type battery power sources utilizing familiar semiconductor and thin film fabrication techniques, thereby minimizing the area occupied by the device and battery in combination to the area occupied by the device itself, and thus enabling a higher degree of device integration to be achieved and making it possible to provide miniaturized onboard primary and standby power sources for a wide range of micro-devices such as semiconductor memory storage devices.

While there has been shown and described what is at present considered the preferred embodiment of the invention, it will be obvious to those skilled in the art that various changes and modifications may be made therein without departing from the scope of the invention as defined by the appended claims.

What is claimed is:

1. A method of fabricating a vertically integrated and electrically interconnecting a thin-film type battery on an electrical or electronic device, comprising:

on an electrical or electronic device having a pair of terminals, forming an electrically non-conductive insulating layer for covering at least a part of an outer surface of the device;

forming vertical contact holes in the insulating layer for exposing the pair of terminals of the device therethrough;

filling the contact holes with an electrically conductive material for forming a pair of vertical conductors in respective contact with corresponding ones of the pair of terminals of the device;

forming a pair of electrically conductive electrode conductors laterally spaced from one another on an outer surface of the insulating layer and in respective contact with corresponding ones of the vertical conductors;

forming a cathodic thin film on one of the pair of electrode conductors;

forming an electrolytic thin film on the cathodic thin film; and forming an anodic thin film on the electrolytic thin film, on an intervening portion of the outer surface of the insulating layer and on the other one of the pair of electrode conductors.

2. The fabrication method according to claim 1, further comprising forming the device on a substrate.

3. The fabrication method according to claim 1, wherein the first one of the pair of electrode conductors on which is formed the cathodic thin film is formed to be greater in area than the other one of the pair of electrode conductors.

4. The fabrication method according to claim 1, wherein the step of forming the pair of electrode conductors is omitted, and the cathodic thin film is formed directly in contact with one of the pair of vertical conductors and the anodic thin film is formed directly in contact with the other one of the pair of vertical conductors.

5. The fabrication method according to claim 1, wherein the insulating layer is formed for completely encapsulating the outer surface of the device, including the pair of terminals thereof.

6. The fabrication method according to claim 1, wherein after the insulating layer is formed a planarization is performed.

7. The fabrication method according to claim 1, further comprising planarizing the insulation layer.

\* \* \* \* \*